Oct. 22, 1957 E. P. PALMATIER 2,810,272
ABSORPTION REFRIGERATION SYSTEM
Filed Sept. 1, 1953 4 Sheets-Sheet 1

INVENTOR.
Everett P. Palmatier
BY Herman Seid
atty.

Oct. 22, 1957  E. P. PALMATIER  2,810,272
ABSORPTION REFRIGERATION SYSTEM
Filed Sept. 1, 1953  4 Sheets-Sheet 2
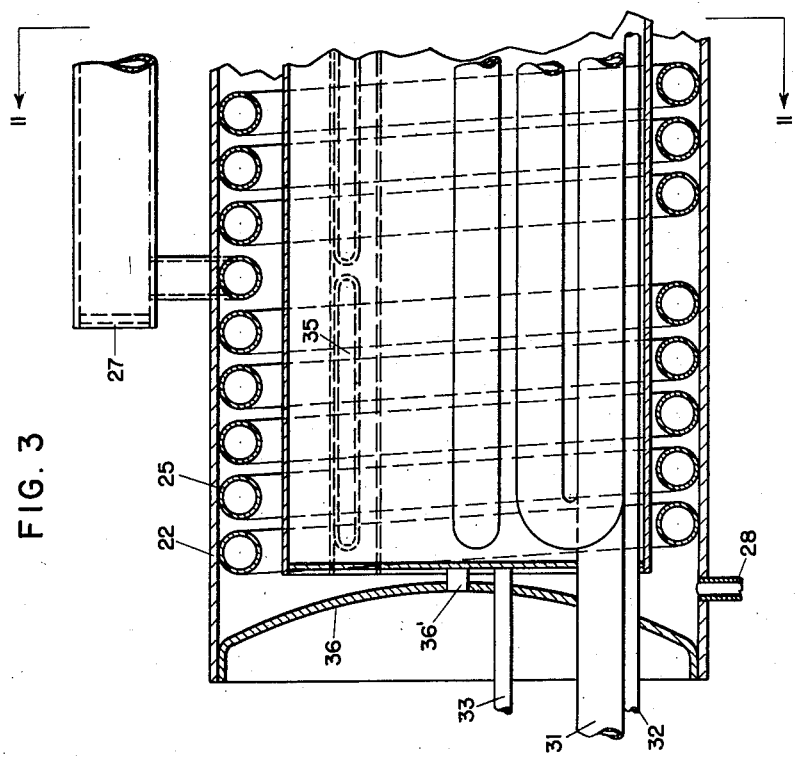
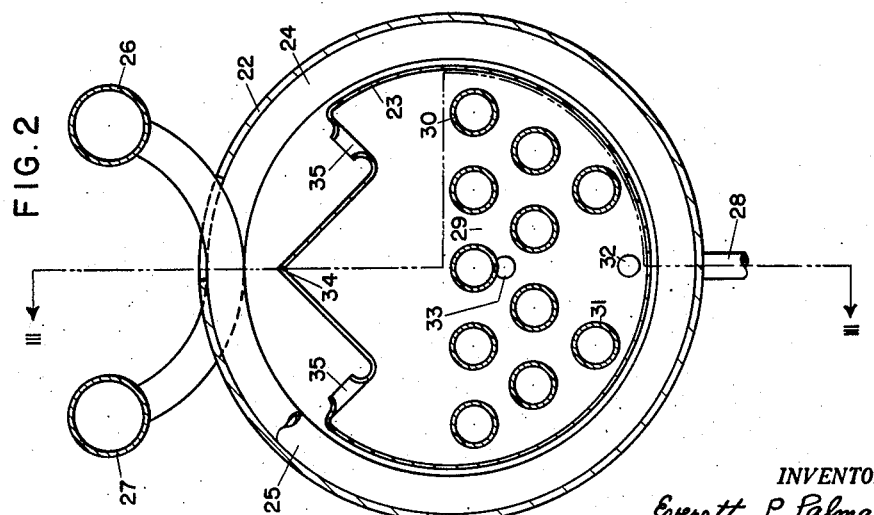
INVENTOR.
Everett P. Palmatier
BY Herman Seid
Atty.

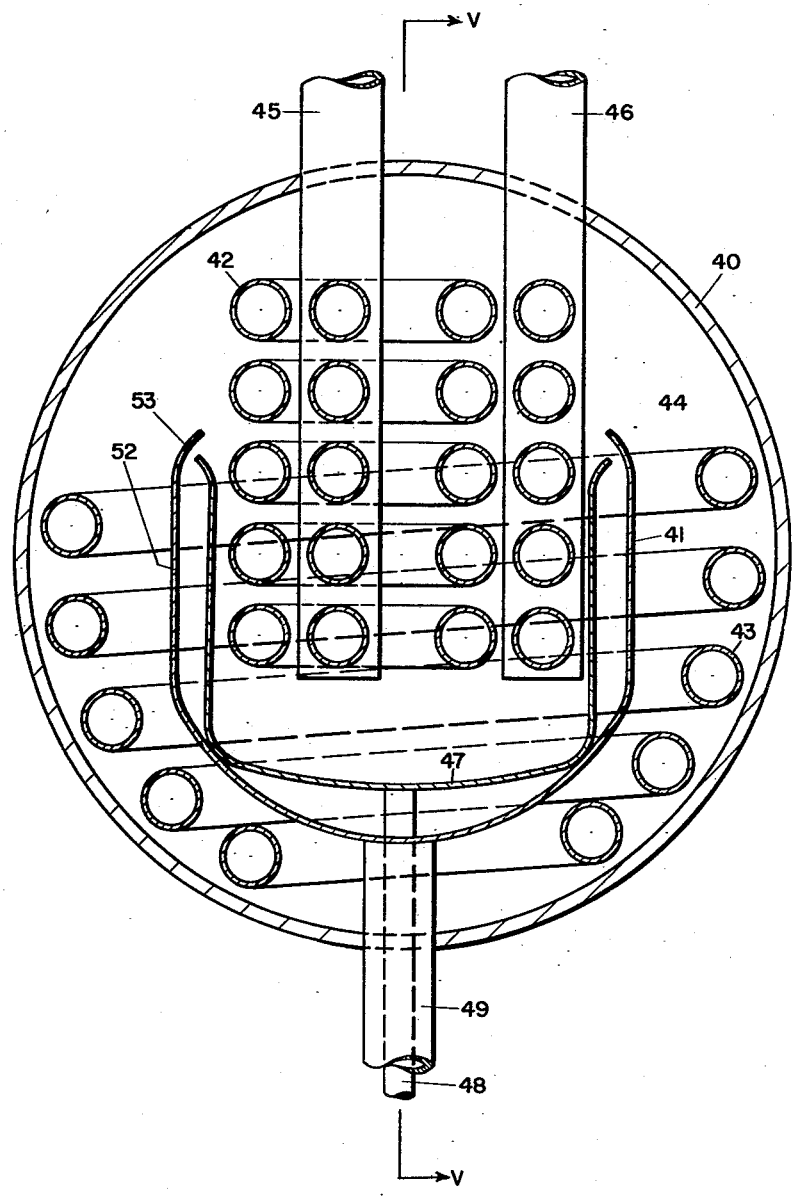

Oct. 22, 1957  E. P. PALMATIER  2,810,272
ABSORPTION REFRIGERATION SYSTEM
Filed Sept. 1, 1953  4 Sheets-Sheet 4
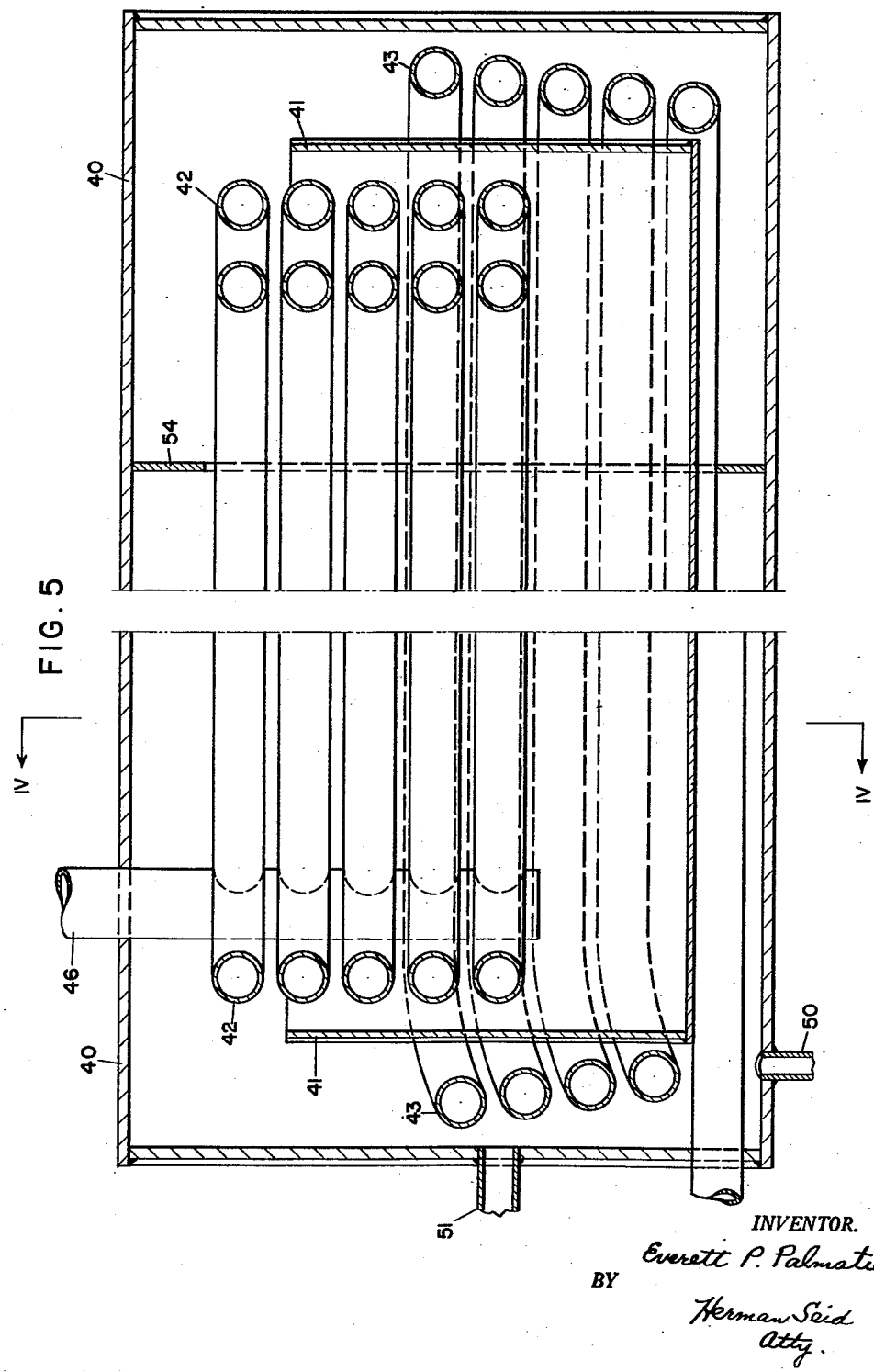
INVENTOR.
Everett P. Palmatier
BY
Herman Seid
Atty.

United States Patent Office 2,810,272
Patented Oct. 22, 1957

2,810,272

ABSORPTION REFRIGERATION SYSTEM

Everett P. Palmatier, Solvay, N. Y., assignor to Carrier Corporation, Syracuse, N. Y., a corporation of Delaware Application September 1, 1953, Serial No. 377,821

18 Claims. (Cl. 62—119)

This invention relates to an absorption refrigeration system and, more particularly, to a unitary structure for the generator and condenser of an absorption refrigeration system.

The chief object of this invention is to provide an absorption refrigeration system including a novel inexpensive heat exchanger in which the generator and condenser of the system are disposed.

An object of the invention is to provide an absorption refrigeration system including a heat exchanger that has an outer shell of thin material.

Another object of the invention is to provide a generator of an absorption refrigeration system with a continuous tube coil. Other objects of my invention will be readily perceived from the following description.

This invention relates to an absorption refrigeration system including an absorber, an evaporator, a generator and a condenser disposed in a closed circuit, a line leading from the absorber to the generator to carry weak solution, a pump in said line, a second line leading from the generator to the absorber to carry strong solution, a third line leading from the condenser to the evaporator to carry liquid refrigerant, a fourth line leading from the evaporator to the absorber to carry vaporized refrigerant, means to pass cooling water through the absorber and the condenser, a shell containing the generator and the condenser, an inner shell spaced from the outer shell, a coil disposed in the space between the shells, a coil disposed within the inner shell, one of said coils forming the condenser, the other of said coils forming the generator, means to maintain solution over at least a portion of the generator coil, and means to permit the vapor of the solution to pass from the space containing the generator coil into the space containing the condenser coil.

This invention also relates to a heat exchanger for an absorption refrigeration system including an outer shell, an inner shell spaced from the outer shell, a coil disposed within the space between the shells, a coil disposed in the inner shell, one of said coils being a condenser, the other of said coils being a heating coil, means to maintain solution over at least a portion of the heating coil, and means to permit the vapor of the solution to pass from the space containing the heating coil into the space containing the condenser coil.

The attached drawings illustrate a preferred embodiment of my invention, in which Figure 1 is a diagrammatic view of an absorption refrigeration system including the heat exchanger of my invention;

Figure 2 is a sectional view of the heat exchanger taken on the line II—II of Figure 3;

Figure 3 is a sectional view taken on the line III—III of Figure 2;

Figure 4 is a sectional view of a modification of my invention taken on the line IV—IV of Figure 5;

Figure 5 is a sectional view taken on the line V—V of Figure 4; and

Figure 1:
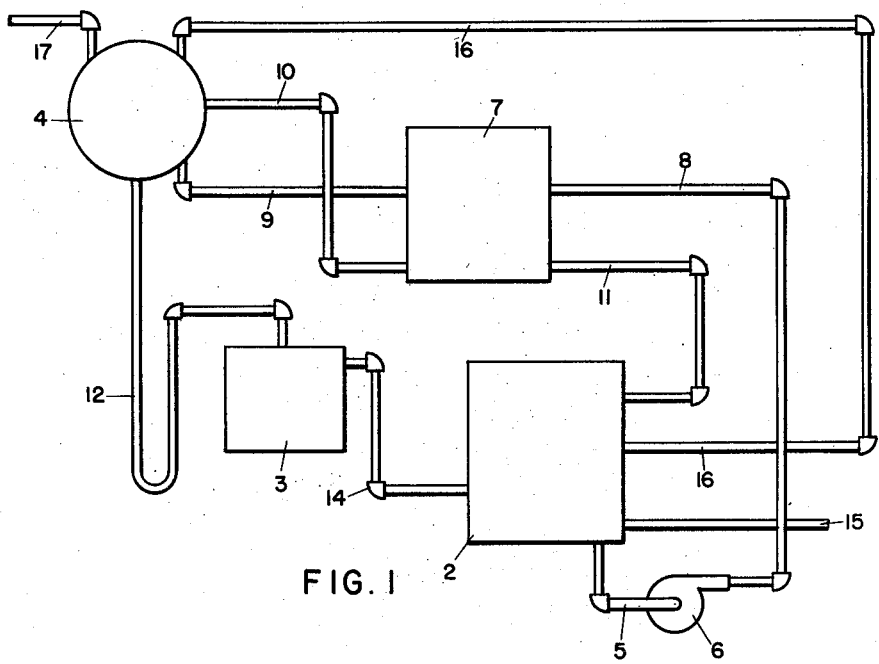

Referring to the drawing, and particularly to Figure 1, there is shown an absorption refrigeration system including an absorber 2, an evaporator 3, and a heat exchanger 4 in which are disposed the generator and condenser of the system. It will be understood that this heat exchanger 4 may be the structure shown in Figure 2, or the modification shown in Figure 4. Weak solution passes from the absorber by means of line 5 to a pump 6 which sends the solution to a heat exchanger 7 by means of line 8. From the heat exchanger 7 the weak solution passes to the heat exchanger 4 by means of line 9. In the heat exchanger 4 some of the water is vaporized by the generator or heating coil and a strong solution leaves the heat exchanger 4 by means of line 10. This strong solution then passes through the heat exchanger 7 where it warms the weak solution prior to its entrance into the heat exchanger 4. The strong solution then passes by means of line 11 to the absorber 2. Meanwhile, the vapor, which was generated from the weak solution by the generator or heating coil, has been condensed and leaves the heat exchanger 4 to pass to the evaporator 3 by means of line 12. This line 12 is looped to provide a pressure seal between the condenser and the evaporator thereby permitting a desired pressure differential to be maintained between the condenser of the heat exchanger 4 and the evaporator. It will be understood that the line 12, which is connected to the drain of the condenser, may be replaced by a straight line in which a restrictor is disposed to provide the difference in pressure. In the evaporator, the water absorbs heat and is changed to a vapor. This vapor escapes to the absorber 2 through the line 14. In the absorber, the vapor is absorbed into the strong solution to provide the weak solution that is pumped by pump 6 to the generator of the heat exchanger 4 to repeat the cycle.

Cooling water is supplied to the absorber by means of line 15. This water then passes to the heat exchanger 4 by means of the line 16. This water is supplied to the heat exchanger 4 to be used in the condenser to condense the vapor generated by the generator coil. The water leaves by line 17 and is carried to a cooling tower or other suitable means, or it may be discharged to waste.

Figure 6:
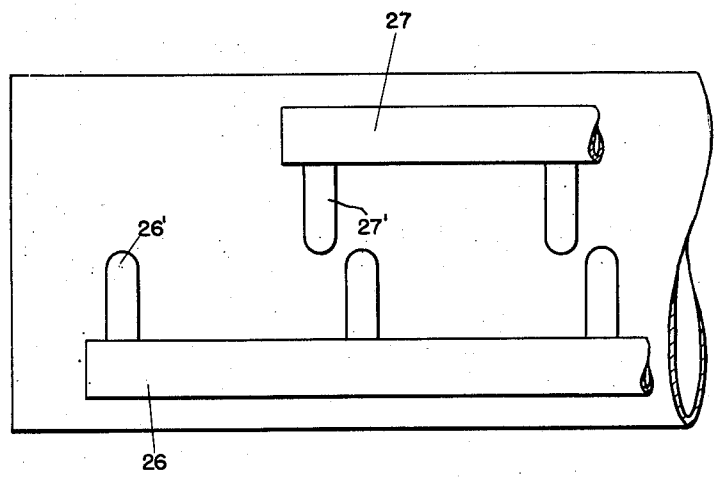
Figure 6 is a plan view of the heat exchanger of my invention.

Referring to the modification of Figures 2 and 3, there is disclosed the heat exchanger 4 of the absorption refrigeration system. This heat exchanger includes an outer shell 22 with an inner shell 23 disposed therein and spaced therefrom. The space 24 between the outer and inner shells 22 and 23 has a multiple helix condenser coil 25 disposed therein and about the inner shell. However, this coil 25 is spaced from the inner shell. Water is supplied to coil 25 by a plurality of lines 26' (Figure 6) that extend from water inlet header 26, which is connected to line 16. Each line 26' leads to a different section of the coil 25 and water leaves each section of the coil through a line 27' that leads to water outlet header 27, which is connected to line 17.

A generator or heating coil 29 is disposed in the lower portion of the inner shell 23. This generator coil is a continuous single circuit with steam entering through line 30 and the condensate leaving through line 31. Weak solution is fed to the inner shell 23 by means of the solution feed line 32. The strong solution leaves the inner shell by means of the solution discharge line 33. The top portion of the inner shell 23 is formed in the shape of an inverted V, as shown at 34. Longitudinal slots 35 (Figure 3) are provided in the V portion of the inner shell. These slots permit communication between the inner shell and the space 24.

Weak solution enters the inner shell 23 by means of the solution feed line 32. Since the solution discharge line 33 is disposed below the top of the generator coil 29, the solution only partially covers the generator coil. Supplying heat to the generator coil 29 results in a decrease in the density of the solution and an accompanying increase in the volume of the solution. This increase in the volume of the solution causes the entire surface of the generator coil 29 to be covered by solution. Boiling of the solution causes foaming because the bubbles of vapor are breaking through the surface of the solution.

The vapor tends to carry droplets of solution with it when it breaks away from the boiling surface of the solution. These droplets are normally prevented from escaping into the condenser coil space 24 by the inverted V portion 34 in the top of the inner shell 23. However, the vapor from the solution will pass through the longitudinal slots 35 into the space 24 where the vapor is condensed by the water passing through the condenser coil 25. This condensate will leave the outer shell by the condensate drain 28, which is connected to the evaporator 3 by line 12.

It will be noted that by placing the condenser coil 25 in the space 24, the condenser coil will be utilized as a support for the outer shell 22. This condenser coil 25 is a multiple wound helix and is of sufficient strength to withstand the atmospheric pressure acting against the outer shell. Therefore, the outer shell may be made of rather thin material, preferably stainless steel, and still not collapse under the high vacuum of normal operation.

The ends 36 of the outer shell 22 are dished inward for maximum strength under vacuum. The inner shell 23 is connected to the ends of 36 of the outer shell 22 by clips 36' that are welded to the ends 36. Other suitable means may be employed to connect the inner shell to the ends 36. The ends 36 are welded to the outer shell 22. It will be understood that the entire heat exchanger is supported by suitable means. The generator coil has the advantage of preventing any steam condensate from being trapped since the steam enters at the top and leaves at the bottom.

Referring to the modification disclosed in Figures 4 and 5, there is shown an outer shell 40 with an inner shell 41 disposed therein and spaced therefrom. In this embodiment, the condenser coil 42 is a placed within the inner shell 41 while the generator coil 43 is disposed in the space 44 between the outer shell 40 and the inner shell 41. Water is supplied to the condenser coil 42 by the water inlet header 45, and the water leaves the condenser coil by means of the water outlet header 46. A U-shaped sheet 47 is positioned within the inner shell 41 for a purpose to be described hereinafter. A drain 48 leads from this sheet 47 through the inner shell 41 and outer shell 40. A conduit 49 is provided in the space 44 to protect the drain 48 from the heat of the generator coil 43.

A solution feed line 50 is provided in the lower portion of the outer shell to supply solution to the outer shell. A solution discharge line 51 is positioned in the outer shell below the top of the generator coil to permit the solution to leave the shell. The outer shell 40 is of cylindrical shape and has its ends closed. The inner shell 41 has an arcuate cross section at its base that is concentric with the base of the outer shell. Vertical parallel walls 52 extend from the base of the inner shell 41 and these walls terminate at 53 to leave the top completely open.

The inner shell 41 is supported from the outer shell 40 by means of support members 54, preferably three in number. These support members are similar in cross-section to inner shell 41 except that the members have an arcuate cross-section at the top. These members are of a thickness to extend between the inner and outer shells. The support members are provided with openings to permit insertion of the generator coil so that it is not necessary to connect the support member to either shell. A tight friction fit is provided between the support members and the shells.

Vapor from the space 44 passes through the open top of the inner shell 41 into the inner shell 41 to be condensed by the water in the condenser coil 42. This condensed vapor will escape from the inner shell by means of the drain 48, which is connected to evaporator 3 by line 12.

The solution only partially covers the generator coil 43 because the solution discharge line 51 is positioned below the top of the generator coil. Supplying heat to the generator coil 43 results in a decrease in the density of the solution and an accompanying increase in the volume of the solution. This increase in the volume of the solution causes the entire surface of the generator coil 43 to be covered by solution. The formation of the vapor in the solution causes foaming because the bubbles of vapor are breaking through the surface of the solution. The vapor tends to carry droplets of solution with it when it breaks away from the boiling surface of the solution. The sides of the inner shell are flattened to provide a greater cross-sectional area thereby decreasing the velocity of the vapor to permit droplets to return to the solution more easily. This will prevent the solution from being carried into the condenser by the vapor.

The U-shaped sheet 47 serves the function of collecting the condensed water and preventing it from coming in contact with the hot inner shell 41, which is heated as a result of its contact with the generator coil 43. While this sheet does not require ends, preferably, it is bent at the ends to keep the condensate from running out and coming in contact with the inner shell. Note that the conduit 49 serves to prevent the condensed vapor in drain 48 from coming in contact with the generator coil 43 during its passage through space 44.

It will be understood that the inner shell 41 may have flat ends and may be of thin material because there is no pressure differential across it. This will, of course, provide a less expensive structure.

While I have described a preferred embodiment of my invention, it will be understood that my invention is not limited thereto since it may be otherwise embodied within the scope of the following claims.

I claim:

1. A heat exchanger for an absorption refrigeration system including an outer shell, an inner shell spaced from the outer shell, a coil disposed in the space between the shells, a coil disposed within the inner shell, one of said coils being a condenser coil, the other of said coils being a heating coil, said inner shell being positioned within the confines of the coil disposed within the space between the shells, means for passing a cooling medium through said condenser coil, means for passing a heating medium through said heating coil, means to maintain solution over at least a portion of the heating coil, and means to permit the vapor of the solution to pass from the space containing the heating coil into the space containing the condenser coil.

2. A heat exchanger according to claim 1 in which the heat exchanger is horizontally disposed.

3. A heat exchanger according to claim 1 including means to move the solution condensate from the space containing the condenser coil.

4. A heat exchanger according to claim 1 in which the coil disposed between the shells serves as a support for said outer shell.

5. In an absorption refrigeration system including an absorber, an evaporator, a generator, and a condenser disposed in a closed circuit, a line leading from the absorber to the generator to carry weak solution, a pump in said line, a second line leading from the generator to the absorber to carry strong solution, a third line leading from the condenser to the evaporator to carry liquid refrigerant, a fourth line leading from the evaporator to the absorber to carry vaporized refrigerant, means to pass cooling water through the absorber, a shell containing the generator and condenser, an inner shell spaced from the outer shell, a coil disposed in the space between the shells, a coil disposed within the inner shell, one of said coils forming the condenser coil, the other of said coils forming the generator, said inner shell being positioned within the confines of the coil disposed within the space between the shells, means for passing a cooling medium through said condenser coil, means for passing a heating medium through said generator coil means to maintain solution over at least a portion of the generator coil, and means to permit the vapor of the solution to pass from the space containing the generator coil into the space containing the condenser coil.

6. A heat exchanger for an absorption refrigeration system comprising two substantially concentric shells, a condenser coil disposed in the space between the two shells means for passing a cooling medium through the condenser coil, a heating coil disposed in the inner shell means for passing a heating medium through the heating coil, means to maintain solution over a portion of the heating coil, and means to permit vapor of the solution to escape from the inner shell to the outer shell.

7. A heat exchanger according to claim 6 in which the heat exchanger is horizontally disposed, the condenser coil is formed in the shape of a multiple helix disposed about the inner shell, and the heating coil is disposed in the lower portion of the inner shell.

8. A heat exchanger according to claim 6 including means to remove solution condensate from the outer shell.

9. A heat exchanger according to claim 6 in which the condenser coil serves as a support for the outer shell.

10. In an absorption refrigeration system including an absorber, an evaporator, a generator, and a condenser disposed in a closed circuit, a line leading from the absorber to the generator to carry weak solution, a pump in said line, a second line leading from the generator to the absorber to carry strong solution, a third line leading from the condenser to the evaporator to carry liquid refrigerant, a fourth line leading from the evaporator to the absorber to carry vaporized refrigerant, means to pass cooling water through the absorber and the condenser, a shell containing the generator and the condenser, an inner shell spaced from the outer shell, a multiple helix coil forming the condenser disposed in the space between the two shells, a coil forming the generator disposed within the lower portion of the inner shell, means to maintain solution over a portion of the generator coil, and means to permit vapor of the solution to escape from the inner shell to the outer shell.

11. A heat exchanger for an absorption refrigeration system comprising an outer shell, an inner shell disposed inside said outer shell and spaced therefrom, a condenser coil disposed within the inner shell, a heating coil disposed in the space between the shells and surrounding a portion of said inner shell, means to maintain solution over at least a portion of the heating coil, and means to permit vapor of the solution to escape from the space between the shells to the inner shell.

12. A heat exchanger according to claim 11 in which the outer shell has a circular cross-section, the inner shell has a cross-section that is arcuate at its base with parallel side walls extending therefrom to increase the distance between the inner and outer shells toward the top.

13. A heat exchanger according to claim 11 in which the heating coil is disposed in the lower portion of the space between the shells.

14. A heat exchanger according to claim 11 including means to remove solution condensate from the inner shell.

15. In an absorption refrigeration system including an absorber, an evaporator, a generator, and a condenser disposed in a closed circuit, a line leading from the absorber to the generator to carry weak solution, a pump in said line, a second line leading from the generator to the absorber to carry strong solution, a third line leading from the condenser to the evaporator to carry liquid refrigerant, a fourth line leading from the evaporator to the absorber to carry vaporized refrigerant, means to pass cooling water through the absorber and the condenser, a shell containing the generator and the condenser, an inner shell disposed inside said outer shell and spaced therefrom, said outer shell having a circular cross-section, said inner shell having a cross-section that is arcuate at its base with parallel side walls extending therefrom to increase the distance between the inner and outer shells towards the top, a coil forming the condenser disposed within the inner shell, a coil forming the generator disposed in the lower portion of the space between the shells and surrounding a portion of said inner shell, means to maintain solution over at least a portion of the generator coil, and means to permit vapor of the solution to escape from the space between the shells to the inner shell.

16. A generator-condenser comprising an outer shell, an inner shell located within and spaced from said outer shell, a heating coil positioned within said inner shell, a condensing coil positioned in the space between said inner and outer shells, and means providing communication between said inner and outer shells whereby vapor which is driven off from a solution in said inner shell by said heating coil is condensed in said outer shell by said condensing coil.

17. A generator-condenser as set forth in claim 16 wherein said condensing coil substantially surrounds said inner shell.

18. A generator-condenser comprising an outer shell, an inner shell located within and spaced from said outer shell, a first heat exchange coil within said inner shell, a second heat exchange coil in the space between said shells surrounding a substantial portion of said inner shell, and means providing communication between said shells whereby vapor which is driven off from a solution in one of said shells by the heat exchange coil therein may pass to said other shell to be condensed by the heat exchange coil therein.

References Cited in the file of this patent

UNITED STATES PATENTS

| | | |
|---|---|---|
| 1,095,165 | Ockel | Apr. 28, 1914 |
| 1,764,197 | Bruehl | June 17, 1930 |
| 1,821,278 | Schuster | Sept. 1, 1931 |
| 1,990,831 | Lea | Feb. 12, 1935 |
| 2,058,098 | O'Neill | Oct. 20, 1936 |
| 2,559,217 | Kehoe | July 3, 1951 |
| 2,565,838 | Berestneff | Aug. 28, 1951 |
| 2,565,943 | Berestneff | Aug. 28, 1951 |
| 2,582,134 | Kimmell et al. | Jan. 8, 1952 |
| 2,690,327 | Sardeson | Sept. 28, 1954 |
| 2,729,952 | Whitlow | Jan. 10, 1956 |